(12) United States Patent
Bentley et al.

(10) Patent No.: US 9,668,606 B2
(45) Date of Patent: *Jun. 6, 2017

(54) MACHINE FOR THE PREPARATION OF BEVERAGES

(71) Applicant: Koninklijke Douwe Egberts B.V., Utrecht (NL)

(72) Inventors: Andrew Charles Bentley, Banbury (GB); Adam Martyn Lloyd, Headington (GB)

(73) Assignee: Koninklijke Douwe Egberts B.V., Utrecht (NL)

( * ) Notice: Subject to any disclaimer, the term of this patent is extended or adjusted under 35 U.S.C. 154(b) by 287 days.

This patent is subject to a terminal disclaimer.

(21) Appl. No.: 14/487,983

(22) Filed: Sep. 16, 2014

(65) Prior Publication Data

US 2015/0068403 A1    Mar. 12, 2015

Related U.S. Application Data

(63) Continuation of application No. 12/528,942, filed as application No. PCT/GB2008/000628 on Feb. 25, 2008, now Pat. No. 8,887,622.

(30) Foreign Application Priority Data

Feb. 27, 2007 (GB) .................................. 0703764.1

(51) Int. Cl.
*A47J 31/00* (2006.01)
*A47J 31/40* (2006.01)
(Continued)

(52) U.S. Cl.
CPC ........... *A47J 31/407* (2013.01); *A47J 31/057* (2013.01); *A47J 31/44* (2013.01); *A47J 31/4403* (2013.01);
(Continued)

(58) Field of Classification Search
CPC ......... A47J 31/44; A47J 31/4403; A47J 31/50
(Continued)

(56) References Cited

U.S. PATENT DOCUMENTS 2,243,895 A   6/1941  Brown
2,715,868 A   8/1955  Brown
(Continued)

FOREIGN PATENT DOCUMENTS

CA    2718656    2/2007
CH     682798   11/1993
(Continued)

OTHER PUBLICATIONS

European Patent Office, Communication of a Notice of Opposition dated Sep. 13, 2012, from corresponding European Patent No. EP 2129270, 28 pages.
(Continued)

*Primary Examiner* — Reginald L Alexander
(74) *Attorney, Agent, or Firm* — Fitch, Even, Tabin & Flannery LLP

(57) ABSTRACT

A beverage preparation machine for dispensing beverages comprising: a housing; a first reservoir station; a first reservoir for containing an aqueous medium, the first reservoir being connectable to said first reservoir station; an auxiliary module station for receiving an auxiliary module.

18 Claims, 8 Drawing Sheets

(51) Int. Cl.
  *A47J 31/057* (2006.01)
  *A47J 31/44* (2006.01)
  *A47J 31/46* (2006.01)
  *A47J 31/50* (2006.01)
  *A47J 31/54* (2006.01)

(52) U.S. Cl.
  CPC .......... *A47J 31/46* (2013.01); *A47J 31/462* (2013.01); *A47J 31/50* (2013.01); *A47J 31/54* (2013.01); *A47J 31/542* (2013.01)

(58) Field of Classification Search
  USPC .................................... 99/284, 290, 275
  See application file for complete search history.

(56) References Cited

U.S. PATENT DOCUMENTS

| | | | |
|---|---|---|---|
| 2,899,106 A | 8/1959 | Weinert | |
| 3,149,471 A | 9/1964 | Boehmer | |
| 3,292,527 A | 12/1966 | Stasse | |
| 3,336,857 A | 8/1967 | Knodt et al. | |
| 3,403,617 A | 10/1968 | Lampe | |
| 3,607,297 A | 9/1971 | Fasano | |
| 3,805,999 A | 4/1974 | Syverson | |
| 4,147,097 A | 4/1979 | Gregg | |
| D255,529 S | 6/1980 | Dziekonski | |
| 4,206,694 A | 6/1980 | Moskowitz | |
| 4,253,385 A | 3/1981 | Illy | |
| 4,382,402 A | 5/1983 | Alvarez | |
| 4,384,512 A | 5/1983 | Keith | |
| 4,389,191 A | 6/1983 | Lowe | |
| 4,448,113 A | 5/1984 | Brabon | |
| 4,452,130 A | 6/1984 | Klein | |
| 4,484,515 A | 11/1984 | Illy | |
| 4,508,023 A * | 4/1985 | Naya | A47J 31/0573 392/467 |
| 4,551,611 A | 11/1985 | Longo | |
| 4,653,390 A | 3/1987 | Hayes | |
| 4,723,688 A | 2/1988 | Munoz | |
| 4,724,752 A | 2/1988 | Aliesch | |
| 4,738,378 A | 4/1988 | Oakley | |
| 4,744,291 A | 5/1988 | Wallin | |
| 4,775,048 A | 10/1988 | Baecchi | |
| 4,787,299 A | 11/1988 | Levi | |
| 4,792,059 A | 12/1988 | Kerner | |
| 4,838,152 A | 6/1989 | Kubicko | |
| 4,846,052 A | 7/1989 | Favre | |
| 4,873,915 A | 10/1989 | Newman | |
| 4,875,408 A | 10/1989 | McGee | |
| 4,876,953 A | 10/1989 | Imamura | |
| 4,917,005 A | 4/1990 | Knepler | |
| 4,920,252 A | 4/1990 | Yoshino | |
| 4,920,870 A | 5/1990 | Newman | |
| 4,921,712 A | 5/1990 | Malmquist | |
| 4,990,352 A | 2/1991 | Newman | |
| D316,795 S | 5/1991 | Brewer | |
| 5,014,611 A | 5/1991 | Illy | |
| 5,063,836 A | 11/1991 | Patel | |
| 5,072,660 A | 12/1991 | Helbling | |
| 5,080,008 A | 1/1992 | Helbling | |
| 5,111,740 A | 5/1992 | Klein | |
| 5,134,924 A | 8/1992 | Vicker | |
| 5,178,058 A | 1/1993 | vanDort | |
| 5,183,998 A | 2/1993 | Hoffman | |
| 5,186,096 A | 2/1993 | Willi | |
| 5,197,374 A | 3/1993 | Fond | |
| 5,209,069 A | 5/1993 | Newnan | |
| 5,242,702 A | 9/1993 | Fond | |
| 5,259,295 A | 11/1993 | Timm | |
| 5,265,520 A | 11/1993 | Giuliano | |
| 5,272,960 A | 12/1993 | Kinna | |
| 5,285,717 A | 2/1994 | Knepler | |
| 5,285,718 A | 2/1994 | Webster | |
| 5,287,797 A | 2/1994 | Grykiewicz | |
| 5,305,639 A | 4/1994 | Pontefract | |
| 5,327,815 A | 7/1994 | Fond | |
| 5,343,799 A | 9/1994 | Fond | |
| 5,347,916 A | 9/1994 | Fond | |
| 5,349,897 A | 9/1994 | King | |
| 5,375,508 A | 12/1994 | Knepler | |
| 5,398,595 A | 3/1995 | Fond | |
| 5,398,596 A | 3/1995 | Fond | |
| 5,408,917 A | 4/1995 | Lussi | |
| 5,440,972 A | 8/1995 | English | |
| 5,455,887 A | 10/1995 | Dam | |
| 5,463,932 A | 11/1995 | Olson | |
| 5,472,719 A | 12/1995 | Favre | |
| 5,473,972 A | 12/1995 | Rizzuto | |
| 5,479,849 A | 1/1996 | King | |
| 5,531,152 A | 7/1996 | Gardosi | |
| 5,549,035 A | 8/1996 | Wing-Chung | |
| 5,564,601 A | 10/1996 | Cleland | |
| 5,603,254 A | 2/1997 | Fond | |
| 5,638,740 A | 6/1997 | Cai | |
| 5,638,741 A | 6/1997 | Cisaria | |
| 5,639,023 A | 6/1997 | Hild | |
| 5,649,472 A | 7/1997 | Fond | |
| D389,694 S | 1/1998 | Vinson | |
| 5,704,275 A | 1/1998 | Warne | |
| 5,724,883 A | 3/1998 | Usherovich | |
| 5,738,001 A | 4/1998 | Liverani | |
| 5,755,149 A | 5/1998 | Blanc | |
| 5,762,987 A | 6/1998 | Fond | |
| 5,776,527 A | 7/1998 | Blanc | |
| 5,794,519 A | 8/1998 | Fischer | |
| 5,826,492 A | 10/1998 | Fond | |
| 5,840,189 A | 11/1998 | Sylvan | |
| 5,858,437 A | 1/1999 | Anson | |
| 5,860,354 A | 1/1999 | Jouatel | |
| 5,862,738 A | 1/1999 | Warne | |
| 5,875,703 A * | 3/1999 | Rolfes | A47J 31/46 222/146.5 |
| 5,897,899 A | 4/1999 | Fond | |
| 5,899,137 A | 5/1999 | Miller | |
| 5,921,168 A | 7/1999 | Nello | |
| 5,943,944 A | 8/1999 | Lassota | |
| 5,967,021 A | 10/1999 | Yung | |
| 5,974,950 A | 11/1999 | King | |
| 5,992,298 A | 11/1999 | Illy | |
| 6,000,317 A | 12/1999 | VanDerMeer | |
| 6,006,653 A | 12/1999 | Sham | |
| 6,009,792 A | 1/2000 | Kraan | |
| D419,821 S | 2/2000 | Powell | |
| 6,021,705 A | 2/2000 | Dijs | |
| 6,029,562 A * | 2/2000 | Sintchak | A47J 31/4403 220/4.02 |
| D423,863 S | 5/2000 | Lupi | |
| 6,062,127 A | 5/2000 | Klosinski | |
| 6,082,245 A | 7/2000 | Nicolai | |
| 6,095,031 A | 8/2000 | Warne | |
| 6,109,168 A | 8/2000 | Illy | |
| 6,117,471 A | 9/2000 | King | |
| 6,142,063 A | 11/2000 | Beaulieu | |
| 6,158,328 A | 12/2000 | Cai | |
| 6,170,386 B1 | 1/2001 | Paul | |
| 6,173,117 B1 | 1/2001 | Clubb | |
| 6,178,874 B1 | 1/2001 | Joergensen | |
| 6,182,554 B1 | 2/2001 | Beaulieu | |
| 6,186,051 B1 | 2/2001 | Aarts | |
| D443,792 S | 6/2001 | Peters | |
| 6,240,832 B1 | 6/2001 | Schmed | |
| 6,240,833 B1 | 6/2001 | Sham | |
| 6,245,371 B1 | 6/2001 | Gutwein | |
| 6,279,459 B1 | 8/2001 | Mork | |
| 6,289,948 B1 | 9/2001 | Jeannin | |
| 6,312,589 B1 | 11/2001 | Jarocki | |
| D452,107 S | 12/2001 | Cahen | |
| D454,466 S | 3/2002 | Hong | |
| 6,405,637 B1 | 6/2002 | Cai | |
| D459,628 S | 7/2002 | Cahen | |
| D460,653 S | 7/2002 | Cahen | |
| D461,358 S | 8/2002 | Cahen | |
| 6,460,735 B1 | 10/2002 | Greenwald | |
| 6,499,388 B2 | 12/2002 | Schmed | |

(56) References Cited

U.S. PATENT DOCUMENTS

| | | |
|---|---|---|
| 6,536,332 B2 | 3/2003 | Schmed |
| D475,567 S | 6/2003 | Hsu |
| 6,606,938 B2 | 8/2003 | Taylor |
| D479,939 S | 9/2003 | Au |
| 6,612,224 B2 | 9/2003 | Mercier |
| 6,644,173 B2 | 11/2003 | Lazaris |
| 6,698,228 B2 | 3/2004 | Kateman |
| 6,698,332 B2 | 3/2004 | Kollep |
| 6,698,333 B2 | 3/2004 | Halliday |
| D489,930 S | 5/2004 | Tse |
| 6,759,072 B1 | 7/2004 | Gutwein |
| 6,786,136 B2 | 9/2004 | Cirigliano |
| D497,278 S | 10/2004 | Picozza |
| 6,799,503 B2 | 10/2004 | Kollep |
| 6,857,353 B2 | 2/2005 | Kollep |
| D502,841 S | 3/2005 | Santer |
| 6,935,222 B2 | 8/2005 | Chen |
| 6,941,855 B2 | 9/2005 | Denisart |
| 6,955,116 B2 | 10/2005 | Hale |
| 7,063,238 B2 | 6/2006 | Hale |
| 7,097,074 B2 | 8/2006 | Halliday |
| 7,104,184 B2 | 9/2006 | Biderman |
| D530,560 S | 10/2006 | Lin |
| 7,213,506 B2 | 5/2007 | Halliday |
| 7,219,598 B2 | 5/2007 | Halliday |
| 7,231,869 B2 | 6/2007 | Halliday |
| 7,243,598 B2 | 7/2007 | Halliday |
| 7,255,039 B2 | 8/2007 | Halliday |
| 7,287,461 B2 | 10/2007 | Halliday |
| 7,308,851 B2 | 12/2007 | Halliday |
| 7,316,178 B2 | 1/2008 | Halliday |
| 7,322,277 B2 | 1/2008 | Halliday |
| 7,325,479 B2 | 2/2008 | Laigneau |
| 7,328,651 B2 | 2/2008 | Halliday |
| 7,340,990 B2 | 3/2008 | Halliday |
| 7,418,899 B2 | 9/2008 | Halliday |
| D582,714 S | 12/2008 | Hensel |
| D585,692 S | 2/2009 | Borin |
| 7,533,603 B2 | 5/2009 | Halliday |
| 7,533,604 B2 | 5/2009 | Halliday |
| 2002/0002913 A1 | 1/2002 | Mariller |
| 2002/0023543 A1 | 2/2002 | Schmed |
| 2002/0048621 A1 | 4/2002 | Boyd |
| 2002/0078831 A1 | 6/2002 | Cai |
| 2002/0121197 A1 | 9/2002 | Mercier |
| 2002/0121198 A1 | 9/2002 | Kollep |
| 2002/0124736 A1 | 9/2002 | Kollep |
| 2002/0129712 A1 | 9/2002 | Westbrook |
| 2002/0130137 A1 | 9/2002 | Greenwald |
| 2002/0144603 A1 | 10/2002 | Taylor |
| 2002/0144604 A1 | 10/2002 | Winkler |
| 2002/0148356 A1 | 10/2002 | Lazaris |
| 2003/0037680 A1 | 2/2003 | Rolland |
| 2003/0056655 A1 | 3/2003 | Kollep |
| 2003/0066431 A1 | 4/2003 | Fanzutti |
| 2004/0191370 A1 | 9/2004 | Halliday |
| 2004/0197444 A1 | 10/2004 | Halliday |
| 2004/0228955 A1 | 11/2004 | Denisart |
| 2004/0237793 A1 | 12/2004 | Zurcher |
| 2005/0284302 A1 | 12/2005 | Levin |
| 2006/0096300 A1 | 5/2006 | Reinstein |
| 2006/0107839 A1 | 5/2006 | Nenov |
| 2006/0226228 A1 | 10/2006 | Gagne |
| 2006/0278093 A1 | 12/2006 | Biderman |
| 2008/0028944 A1* | 2/2008 | Webster ............... A47J 31/057 99/283 |
| 2010/0107887 A1 | 5/2010 | Bentley et al. |

FOREIGN PATENT DOCUMENTS

| | | |
|---|---|---|
| CN | 2523331 | 12/2002 |
| DE | 19856165 | 6/2000 |
| DE | 19857165 | 6/2000 |
| EP | 0151252 | 8/1985 |
| EP | 0334571 | 9/1989 |
| EP | 0334572 | 9/1989 |
| EP | 0162417 | 3/1990 |
| EP | 0469162 | 2/1992 |
| EP | 0604615 | 7/1994 |
| EP | 0638486 | 2/1995 |
| EP | 0862882 | 9/1998 |
| EP | 0870457 | 10/1998 |
| EP | 0904718 | 3/1999 |
| EP | 1055386 | 11/2000 |
| EP | 1090574 | 4/2001 |
| EP | 1095605 | 5/2001 |
| EP | 1153561 | 11/2001 |
| EP | 1208782 | 5/2002 |
| EP | 0919171 | 1/2003 |
| EP | 1316283 | 6/2003 |
| EP | 0904719 | 8/2003 |
| EP | 1440640 | 7/2004 |
| EP | 1530940 | 5/2005 |
| EP | 1541070 | 11/2006 |
| EP | 1739060 | 1/2007 |
| EP | 1772398 | 11/2007 |
| EP | 1864598 | 12/2007 |
| EP | 2129270 | 12/2011 |
| FR | 1537031 | 8/1968 |
| GB | 468248 | 7/1937 |
| GB | 828529 | 2/1960 |
| GB | 1215840 | 12/1970 |
| GB | 2374795 | 10/2002 |
| GB | 2374816 | 10/2002 |
| GB | 2374856 | 10/2002 |
| GB | 2379624 | 3/2003 |
| JP | 287759 | 7/1990 |
| JP | 618259 | 3/1994 |
| JP | H07-108277 A | 4/1995 |
| JP | 2000355375 | 12/2000 |
| RU | 688175 | 9/1979 |
| RU | 2283016 | 9/2006 |
| WO | 9507648 | 3/1995 |
| WO | 9516377 | 6/1995 |
| WO | 9717006 | 5/1997 |
| WO | 9847418 | 10/1998 |
| WO | 0042891 | 7/2000 |
| WO | 0115582 | 3/2001 |
| WO | 0219875 | 3/2002 |
| WO | 02085170 | 10/2002 |
| WO | 02087400 | 11/2002 |
| WO | 03005295 | 1/2003 |
| WO | 03026470 | 4/2003 |
| WO | 03053200 | 7/2003 |
| WO | 03059778 | 7/2003 |
| WO | 03065859 | 8/2003 |
| WO | 03065859 | 12/2003 |
| WO | 2004033335 | 4/2004 |
| WO | 2004064585 | 8/2004 |
| WO | 2005017849 | 2/2005 |
| WO | 2005100257 | 10/2005 |
| WO | 2005107540 | 11/2005 |
| WO | 2007017849 | 2/2007 |

OTHER PUBLICATIONS

European Patent Office, Decision of the Opposition Division and Minutes of Oral Proceedings, dated May 21, 2014 from corresponding European Patent No. 2129270, 40 pages.

Further Facts and Arguments of Patent Opposers, Nestec S.A., dated Jul. 19, 2013, from Opposition of related European Patent No. 2129270, 14 pages.

Further Submissions by Patent Proprietor, Kraft Foods R & D, Inc., dated Apr. 11, 2014, from Opposition of related European Patent No. 2129270, 46 pages.

International Search Report and Written Opinion of related International (PCT) Patent Application No. PCT/GB2008/000628, dated Jul. 23, 2008, 12 pages.

Observations of Patent Proprietor, Kraft Foods R & D, Inc., dated Apr. 19, 2013, from Opposition of related European Patent No. 2129270, 11 pages.

(56) References Cited

OTHER PUBLICATIONS

Grounds of Appeal by Patent Opposer Nestec S.A., from opposition of related European Patent No. 2129270, dated Sep. 18, 2014, 16 pages.
Counterstatement, from opposition of related European Patent No. 2129270, dated Jan. 19, 2015, 39 pages.
Response to Counterstatement, from opposition of related European Patent No. 2129270, dated Jun. 12, 2015, 13 pages.
Korean Patent Office, Office Action dated Feb. 23, 2017, from corresponding Korean Patent Application No. 10-2015-7007952, 6 pages.

* cited by examiner

MACHINE FOR THE PREPARATION OF BEVERAGES

CROSS-REFERENCE TO RELATED APPLICATIONS

This application is a continuation of U.S. patent application Ser. No. 12/528,942, filed Aug. 27, 2009, which is a U.S. national phase application filed under 35 U.S.C. §371 of International App. No. PCT/GB2008/000628, filed on Feb. 25, 2008, designating the United States, which claims priority to Great Britain Patent App. No. 0703764.1, filed Feb. 27, 2007, which are all hereby incorporated by reference herein in their entireties.

FIELD OF THE INVENTION

The present invention relates to improvements in or relating to a machine for the preparation of beverages.

BACKGROUND

Beverage preparation systems for producing beverages such as coffee and tea are known in the art. One example is described in WO2004/064585 which teaches a beverage preparation system suitable for producing a wide range of beverages such as coffee, tea, hot chocolate, espresso and cappuccino.

Attempts have been made to produce alternative beverage preparation systems capable of dispensing both hot and cold beverages. However, such systems rely on the provision of a relatively high capacity, on-demand cooler, such as a flash cooler, for cooling relatively large volumes of water very quickly to a suitable temperature when a cold beverage is to be dispensed. Alternatively, the systems provide high capacity coolers for lowering the temperature of the water in the whole storage reservoir to the required temperature for cold beverages. High capacity coolers are those able to quickly cool either relatively large volumes of water by a moderate amount or to produce a relatively large temperature change in smaller volumes of water. These systems have disadvantages, including the problem that the high capacity coolers are large, noisy and contain a refrigerant gas as part of the cooling circuit. This makes the systems bulky, expensive and difficult to recycle. Thus they are unsuitable for use in a domestic setting.

SUMMARY

According to the present invention there is provided a beverage preparation machine for dispensing beverages comprising:
a housing;
a first reservoir station;
a first reservoir for containing an aqueous medium, the first reservoir being connectable to said first reservoir station;
an auxiliary module station for receiving an auxiliary module.

An auxiliary module may be provided which is connectable to said auxiliary module station.

Advantageously the auxiliary module station is movable between first and second positions. The auxiliary module station may be movable from a storage position, in which the auxiliary module station is substantially hidden from external view, and an operating position in which the auxiliary module is connectable to the auxiliary module station. The auxiliary module station may be rotated between its first and second positions. Alternatively the auxiliary module station may be translated between its first and second positions. Alternatively, the auxiliary module station may be formed on a hinged panel which is rotatable between its first and second positions.

Optionally, the auxiliary module station is suitable for receiving a second reservoir for containing an aqueous medium. Optionally, an auxiliary module is connectable to the first reservoir station.

The machine may further comprise a second reservoir station and a second reservoir for containing an aqueous medium, the second reservoir being connectable to said second reservoir station.

Preferably, the first and second reservoirs are interchangeably connectable to the first and second reservoir stations.

Optionally, an auxiliary module is connectable to the second reservoir station.

The auxiliary module may be a chilling module. The chilling module may comprise a thermoelectric cooler (TEC) or peltier heat pump. The chilling module may comprise a recirculation mechanism for diverting aqueous medium cooled by the chilling module back to the reservoir.

The first reservoir preferably contains aqueous medium at ambient temperature. Ambient temperature is understood to mean the background temperature of the location in which the machine is utilised and may vary as the temperature of the location changes with time.

The second reservoir preferably contains aqueous medium at a temperature of between 5 and 30 degrees Celsius below ambient temperature. More preferably, the aqueous medium is at a temperature of between 5 and 15 degrees Celsius below ambient temperature. The second reservoir may contain aqueous medium at an absolute temperature of between 4 and 15 degrees Celsius depending on the local ambient temperature level.

Alternatively, the auxiliary module may be an aqueous medium filtration unit, a pre-heating module, a telemetry unit, a disinfection module or a reservoir for containing an aqueous medium.

The machine may comprise two or more auxiliary modules.

Where there are two auxiliary modules, a first auxiliary module may be connected to the auxiliary module station and a second auxiliary module may be connected to the first reservoir station.

Alternatively, where there are two auxiliary modules wherein a first auxiliary module may be connected to a first auxiliary module station and a second auxiliary module may be connected to a second auxiliary module station.

Alternatively, where there are two auxiliary modules a first auxiliary module may be connected to the auxiliary module station and a second auxiliary module may be connected to a second reservoir station.

In another aspect of the present invention there is provided a beverage preparation machine for dispensing beverages comprising:
a housing;
a first reservoir station;
a first reservoir for containing an aqueous medium, the first reservoir being connectable to said first reservoir station;
an auxiliary module, wherein the auxiliary module comprises a first interface for connecting the auxiliary module to the first reservoir station and a second interface for connecting the first reservoir to the auxiliary module such that, on assembly, the auxiliary module is located in between the first reservoir and the first reservoir station.

The machine may further comprise a second reservoir station and a second reservoir for containing an aqueous medium, the second reservoir being connectable to said second reservoir station.

The auxiliary module may be connected in between the second reservoir and second reservoir station.

The auxiliary module may be selected from a chilling module, a pre-heating module, an aqueous medium filtration unit, a disinfection module and a telemetry unit.

A heater may be provided in fluid communication with the first reservoir station and or the second reservoir station.

Preferably the first reservoir contains aqueous medium at ambient temperature.

Preferably the second reservoir contains aqueous medium at a temperature of between 5 and 30 degrees Celsius below ambient temperature. More preferably, the aqueous medium is at a temperature of between 5 and 15 degrees Celsius below ambient temperature. The ambient temperature will vary according to the local climate in which the machine is used. Preferably, the second reservoir contains aqueous medium at a temperature of between 4 and 15 degrees Celsius.

The chilling module may comprise a recirculation mechanism for diverting aqueous medium cooled by the chilling module back to the reservoir.

The second reservoir may be thermally insulated.

In another aspect of the present invention there is provided a beverage system for dispensing hot and cold beverages comprising:

a) a beverage preparation machine for dispensing beverages formed from one or more beverage ingredients by use of an aqueous medium, wherein the beverage preparation machine comprises:

a housing;

a first reservoir station;

a second reservoir station; and a heater in fluid communication with the first station for heating aqueous medium;

b) a first reservoir containing an aqueous medium, the first reservoir being connectable to said first reservoir station so as to be in fluid communication with said heater; and c) a removable second reservoir containing an aqueous medium at a temperature below ambient, the second reservoir being connectable to said second reservoir station.

Preferably the first reservoir contains aqueous medium at ambient temperature.

Preferably the second reservoir contains aqueous medium at a temperature of between 5 and 30 degrees Celsius below ambient temperature. More preferably, the aqueous medium is at a temperature of between 5 and 15 degrees Celsius below ambient temperature. 36. The second reservoir may contain aqueous medium at a temperature of between 4 and 15 degrees Celsius.

Preferably the second reservoir is thermally insulated.

The machine or system of the present invention may further comprise a recirculation mechanism for diverting aqueous medium from the first or second reservoirs back to the first or second reservoirs or from the auxiliary module back to the auxiliary module wherein the recirculation mechanism comprises a source of UV for disinfecting the aqueous medium as it circulates in the recirculation mechanism. Advantageously, using UV light to disinfect the aqueous medium as it recirculates allows for a lower power UV-emitter to be used as the total exposure time is increased.

Preferably, the source of UV are UV LEDs. Preferably, the UV LEDs have a wavelength of emitted light of between 250 and 320 nm. The extended exposure time of the aqueous medium to the UV light due to the recirculation of the water as well as the use of a small focus area for the LEDs allows a low power output to be used to provide effective disinfection.

The recirculation mechanism may also comprise a chilling mechanism. However, the UV disinfection may be used on any or all aqueous medium supplies forming part of the system.

In one embodiment a recirculation mechanism and a UV source are provided as part of a disinfection auxiliary module.

In another embodiment a recirculation mechanism, a chilling mechanism and a UV source are all provided as part of a chilling module.

Filtered UV light may be used to illuminate or fluoresce the reservoirs or medium contained therein.

The machine and system described is suitable for dispensing a range of hot and cold, extracted/infused or diluted beverages including, but not limited to, coffee, tea, cappuccino, hot chocolate, iced tea, fruit cordials, smoothies and frappés.

The present invention also provides a beverage system for dispensing hot and cold beverages comprising:

a) a beverage preparation machine for dispensing beverages formed from one or more beverage ingredients by use of an aqueous medium, wherein the beverage preparation machine comprises:

a first reservoir station; and a heater in fluid communication with the first station for heating aqueous medium;

b) a first reservoir containing an aqueous medium, the first reservoir being connectable to said first reservoir station so as to be in fluid communication with said heater; and c) a removable second reservoir containing an aqueous medium at a temperature below ambient, the second reservoir being connectable to said first reservoir station.

By using a single reservoir station and swapping in and out interchangeable reservoirs containing aqueous medium, such as water, of different temperatures a compact system is achieved that can efficiently dispense beverages that are either hot or cold.

Preferably the first reservoir contains aqueous medium at ambient temperature.

Preferably the second reservoir contains aqueous medium at a temperature of between 5 and 30 degrees Celsius below ambient temperature.

Optionally the aqueous medium is at a temperature of between 4 and 15 degrees Celsius.

Preferably the second reservoir is thermally insulated. Advantageously, the second reservoir can be stored in a fridge prior to attachment to the reservoir station to maintain the aqueous medium, such as water, at the required, chilled, temperature.

BRIEF DESCRIPTION OF THE DRAWINGS

Embodiments of the present invention will now be described, by way of example only, with reference to the accompanying drawings, in which.

DETAILED DESCRIPTION OF THE DRAWINGS

Figure 1:
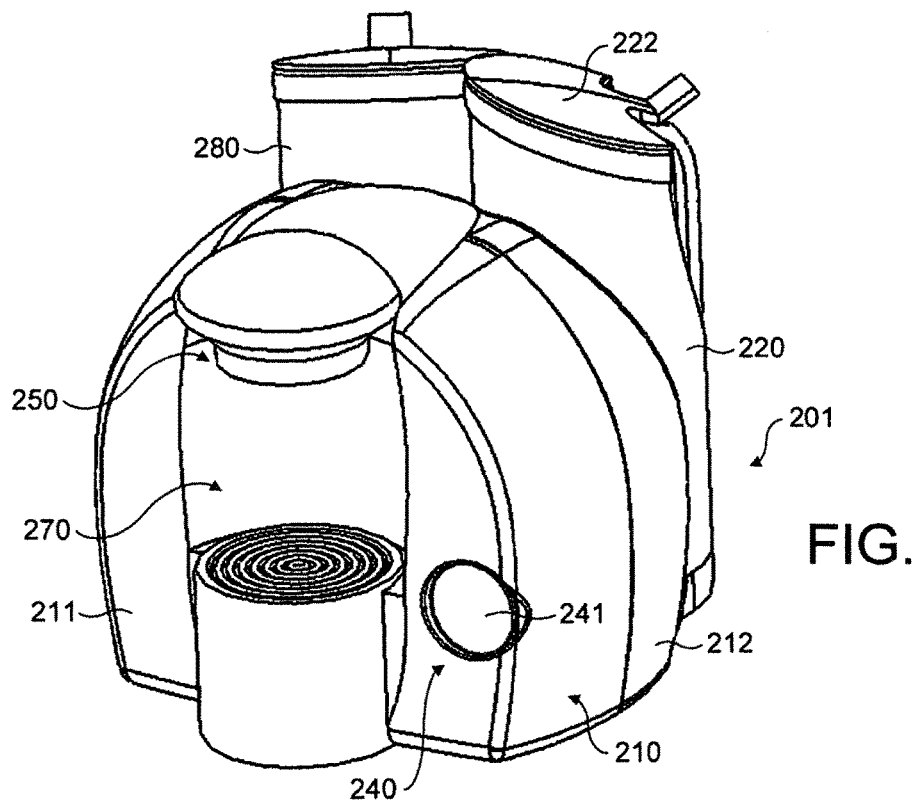
FIG. 1 is a front perspective view of a first embodiment of beverage preparation machine according to the present invention.
Figure 2:
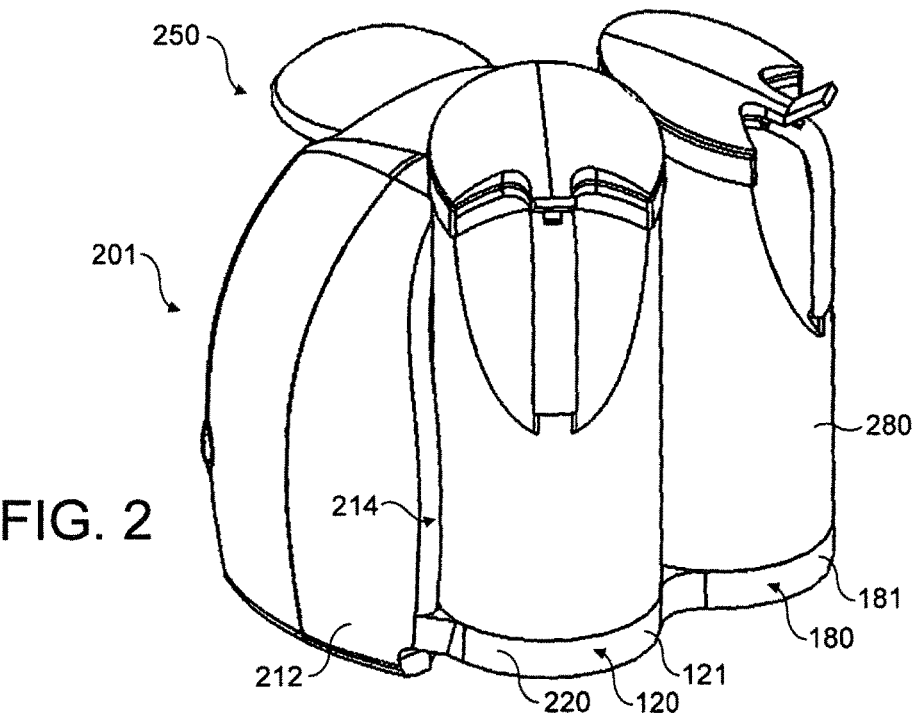
FIG. 2 is a rear perspective view of the machine of FIG. 1.
Figure 3:
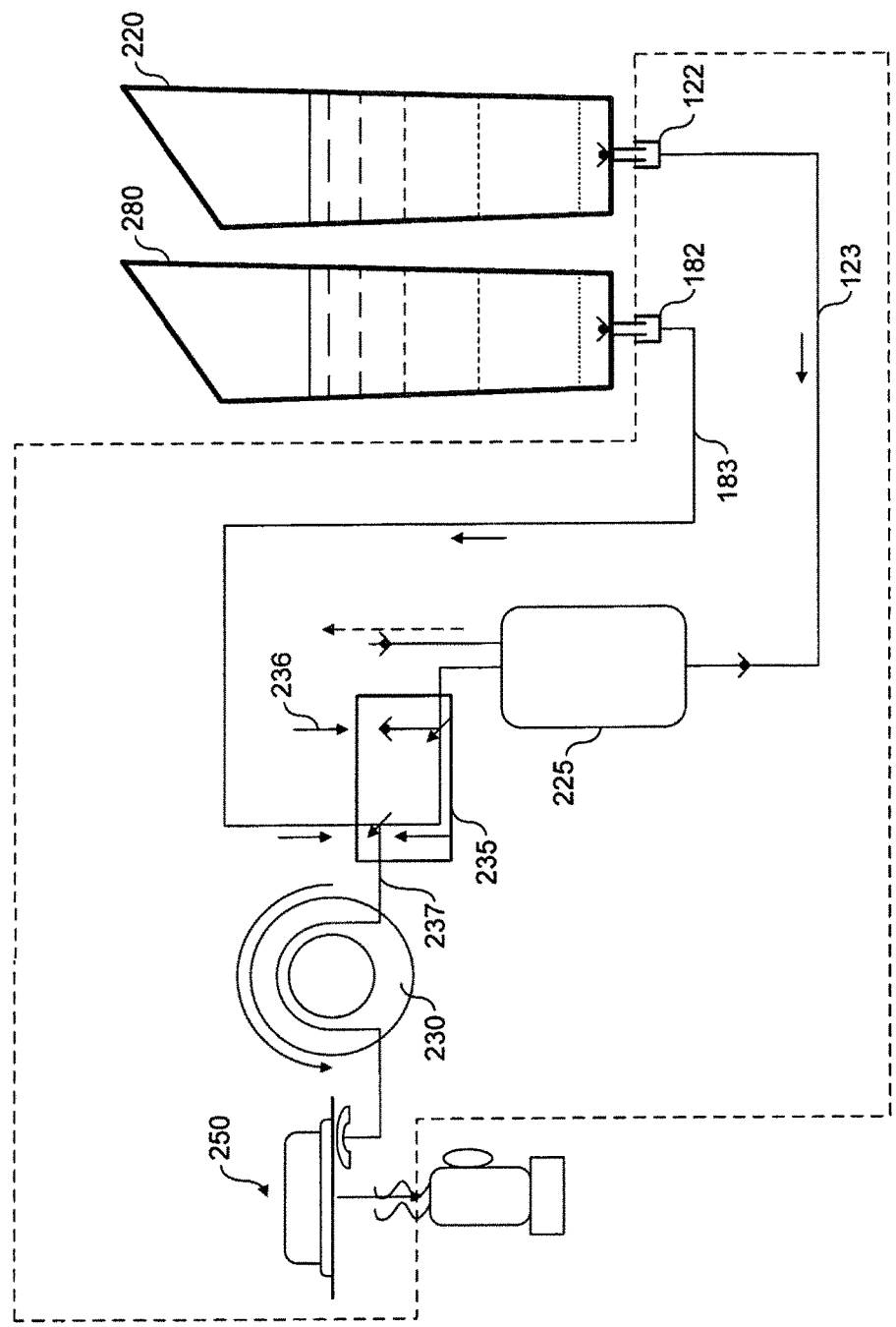
FIG. 3 is a schematic representation of the machine of FIG. 1.

FIGS. 1 to 3 show a first embodiment of beverage preparation machine according to the present invention. The beverage preparation machine is of the general type described and shown in WO2004/064585 except for modifications as described below relating to the present invention as defined by the appended claims. WO2004/064585 describes fully the basic design and functioning of the beverage preparation machine and the design and function of the beverage cartridges used with the machine. These aspects will not be described in detail here except where relevant to the present invention. The contents of WO2004/064585 are incorporated herein by reference.

It will be appreciated that the invention may find application with other types of beverage preparation machine and for the purposes of the present invention there is no requirement for the beverage ingredients to be derived from cartridges or delivered in a single-dose format.

As shown in FIGS. 1 and 2 the beverage preparation machine 201 generally comprises a housing 210 containing a water heater 225, a water pump 230, a dispensing valve 235 with an air inlet 236, a control processor, a user interface 240 and a cartridge head 250. The cartridge head 250 in turn generally comprises a cartridge holder for holding, in use, the beverage cartridge, cartridge recognition means and inlet and outlet piercers, for forming, in use, an inlet and an outlet in the beverage cartridge.

The front half 211 of the housing 210 comprises a dispense station 270 where dispensation of the beverage takes place.

The machine user interface 240 is located on the front of the housing 210 and comprises a start/stop button 241. The start/stop button 241 controls commencement of the operating cycle and is a manually operated push-button, switch or similar. The button 241 may also be used to manually stop the operating cycle.

A rear half 212 of the housing 210 provides a recess 214 for the attachment of first and second water tanks 220, 280.

The first water tank 220 may be made from a transparent or translucent material to allow a consumer to view the quantity of water remaining in the tank. Alternatively, the first water tank 220 may be made from an opaque material but have provided a viewing window therein. In addition, or in place of the above, the first water tank 220 may be provided with a low level sensor which prevents operation of the water pump 230 and optionally triggers a warning indicator, such as an LED, when the water level in the tank descends to a preselected level. The first water tank 220 preferably has an internal capacity of approximately 1.5 liters.

The first water tank 220 is connected in use to a first water tank station 120. The first water tank 220 comprises a generally cylindrical body 221 which may be right circular or a frustum as desired for aesthetic reasons. The tank comprises an open upper end forming an inlet for filling the tank with water which is closed off in use by a manually removable lid 222. An outlet is provided towards a lower end of the tank. The outlet contains a valve which is biased into a closed position when the first water tank is removed from the first water tank station 120. The outlet may also be provided with a filter to prevent ingress of solid particulates into the internal parts of the machine. The first water tank station 120 comprises a base plate 121 shaped to receive a lower end of the first water tank 220. The base plate 121 is provided with a valve connector 122 that matingly connects with the outlet valve of the first water tank 220 when the tank is placed on the base plate. Connection of the tank 220 to the station 120 opens the valve and allows for water flow therethrough.

As shown in FIG. 3, a conduit 123 extending internally from the valve connector 122 communicates with the water heater 225.

The beverage preparation machine 201 is provided with a second water tank station 180. The second water tank station 180 comprises a base plate 181 having a valve connector 182 in the same manner as the first water tank station 120. The second water tank 280 is locatable on the second water tank station 180. The second water tank 280 is provided with an outlet valve of the same type as the first water tank and connects to the valve connector in the same manner as described above. The construction and materials of the second water tank 280 are preferable the same as those of the first water tank 220.

The base plates 121 and 181 are preferable formed as one piece having separate indentations marking the locations of the first and second water tanks 220, 280.

A conduit 183 extends internally from the valve connector 182 of the second water tank station to the dispensing valve 235.

The water pump 230 is a volumetric displacement pump that creates sufficient suction head to draw water from the tanks through the heater and the dispensing valve 250. Preferably a peristaltic type pump is used such that each revolution delivers a known volume of water. The water pump 230 provides a maximum flow rate of 900 ml/min of water at a maximum pressure of 2.5 bar. Preferably, in normal use, the pressure will be limited to 2 bar. The flow rate of water through the machine can be controlled by the control processor to be a percentage of the maximum flow rate of the pump by speed control. Preferably the pump can be driven at any of 10%, 20%, 30%, 40%, 50%, 60%, 70%, 80%, 90% or 100% of the maximum rated flow rate. The accuracy of the volume of water pumped is preferably + or −5% leading to a + or −5% accuracy in the final volume of the dispensed beverage. Where a peristaltic pump is used the volume delivered can be determined by the number of revolutions. Alternatively, for example where a peristaltic pump is not used, a volumetric flow sensor (not shown) can be provided in the flow line either upstream or downstream of the water pump 230. Preferably, the volumetric flow sensor would be a rotary sensor.

The dispensing valve 235 preferably comprises an assembly of two electrically operated solenoid change-over valves with associated non-return valves as shown schematically in FIG. 3. In order to correctly route water through the machine from the first or second water tanks to the cartridge head the respective solenoid valve of the dispensing valve 250 is selected by the control processor before flow commences.

The water heater 225 has a power rating of 1550 W and is able to heat water received from the water pump 230 from a starting temperature of approximately 20° C. to an operating temperature in the range of around 88 to 94° C. in under 1 minute. Preferably the dwell time between the end of one operating cycle and the heater 225 being able to commence a subsequent operating cycle is less than 10 seconds. The heater maintains the selected temperature to within + or −2° C. during the operating cycle. Preferably the water for the operating cycle may be delivered to the cartridge head 250 at 88° C., 91° C. or 94° C. The heater 225 is able to quickly adjust the delivery temperature within the range 88° C. or 94° C. The heater 225 comprises an over-temperature cut-off which shuts off the heater if the temperature exceeds 98° C.

The dispensing valve 235 receives water supply inlets from the water heater 225 and the second water tank 280 as shown in FIG. 3. In addition, the air inlet 236 allows air to be pumped to the cartridge head 250. If required a separate air compressor may be incorporated into the air supply route. The water/air outlet 237 from the dispensing valve 235 connects to the water pump 230. In turn, the water pump 230 connects to the cartridge head 250.

The control processor of the beverage preparation machine comprises a processing module and a memory. The control processor is operatively connected to, and controls operation of, the water heater 225, water pump 230, dispensing valve 235 and user interface 240.

In use, the first water tank 220 is used to provide water for hot drinks and the water passes through the water heater 225 on the way to the cartridge head 250. The second water tank 280 is used to provide water for cold drinks or drinks served at ambient temperature and the water does not pass through the water heater 225. The water in the second water tank 280 may be chilled before it is poured into the tank. However, preferably, the tank, containing the water, may be chilled in a refrigerator. Preferably the water in the second water tank 280 when connected to the secondary water tank station is at between 5 and 30 degrees Celsius below ambient or room temperature, more preferably at between 5 and 15 degrees Celsius below ambient. The shape and size of the tank allows the tank to be fitted into a domestic refrigerator door when disconnected from the beverage preparation machine.

The first and second water tanks 220, 280 may be interchangeable on the first and second water tank stations 120, 180. In other words, one design of tank may be used for fitting to the first and second water tank stations 120, 180.

Figure 4:
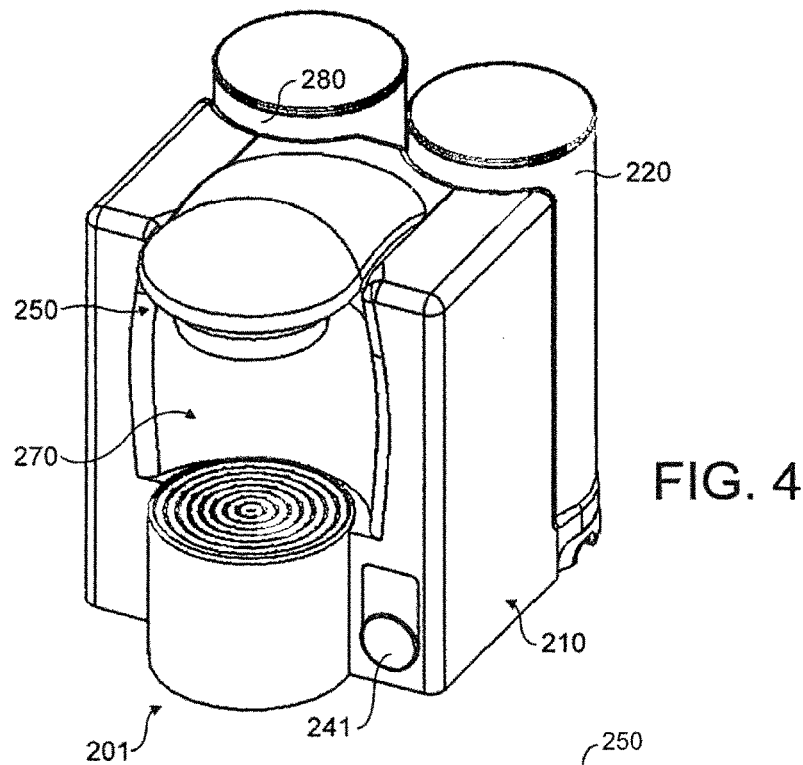
FIG. 4 a front perspective view of a second embodiment of beverage preparation machine according to the present invention.
Figure 5:
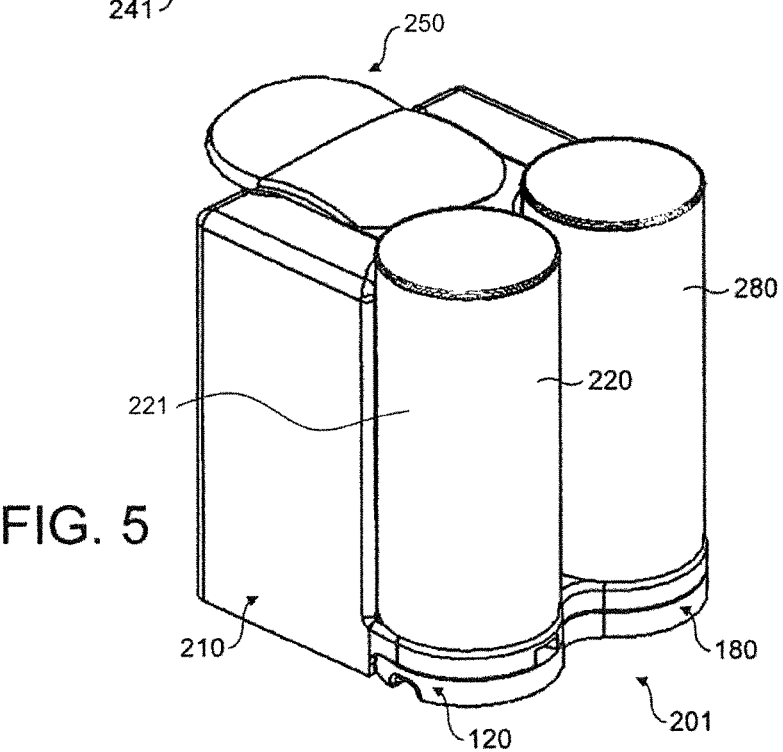
FIG. 5 is a rear perspective view of the machine of FIG. 4.

FIGS. 4 to 7 show a second embodiment of beverage preparation machine 201 according to the present invention. As with the first embodiment, the machine comprises first and second water tanks 220, 280 and first and second water tank stations 120, 180. As shown in FIG. 4 the design of the housing 210 is of a different shape but the function of the components of the machine is the same as that of the first embodiment described above except where noted differently below.

Figure 6:
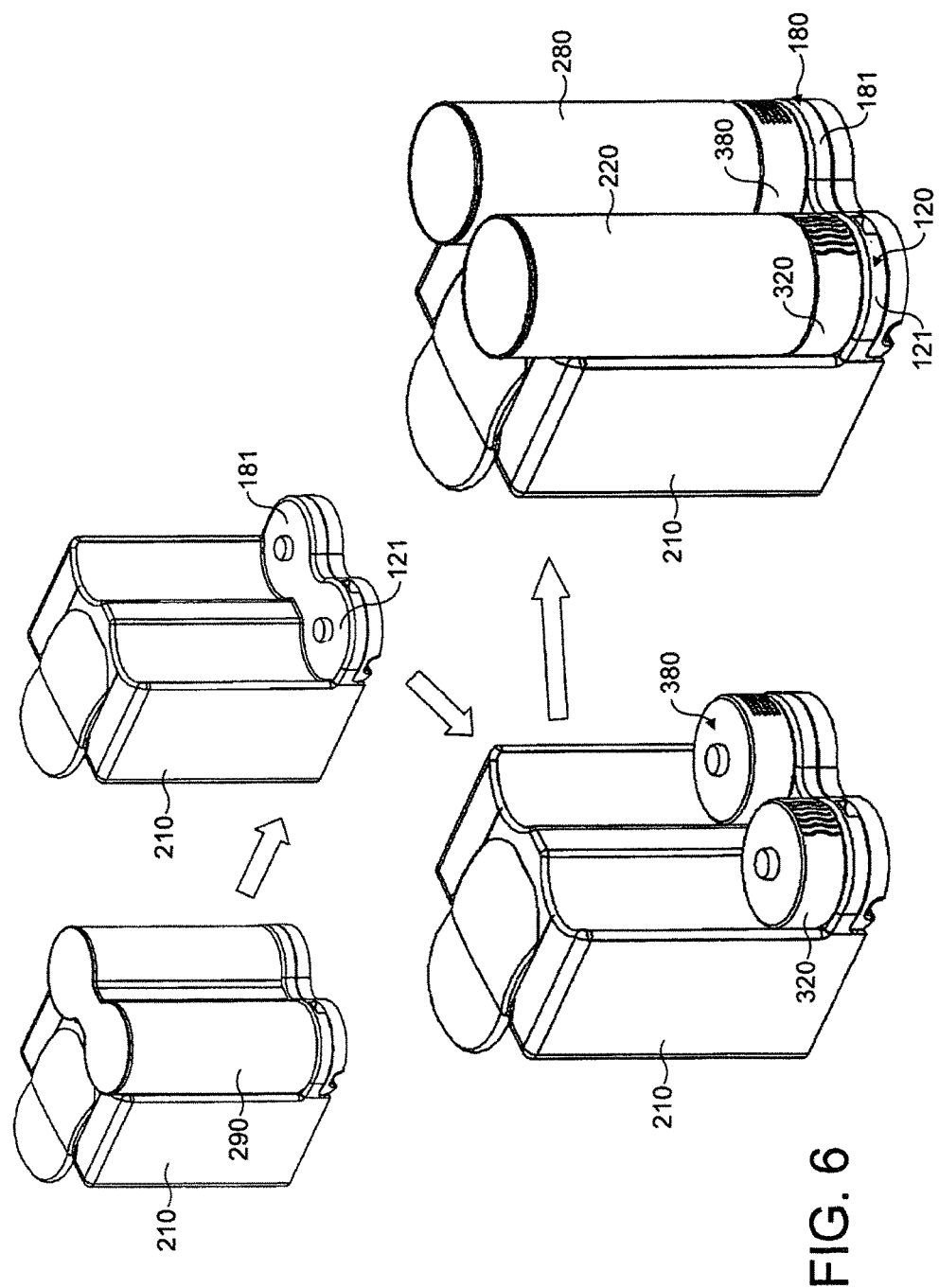
FIG. 6 shows a series of perspective views of the machine of FIG. 4 illustrating the fitting of two auxiliary modules.

As shown in FIG. 6 the beverage preparation machine is provided with one or more auxiliary modules. In the illustrated embodiment two auxiliary modules are shown mounted to the first and second water tank stations 120, 180.

A pre-heating module 320 is mounted on the first water tank station 120 between the first water tank 220 and the base plate 121. A chilling module 380 is mounted on the second water tank station 180 between the second water tank 280 and the base plate 180. It should also be noted that FIG. 6 shows an optional arrangement where the beverage preparation machine is provided with a single water tank 290 of double capacity which is located on both the first and second water tank stations.

The auxiliary modules 320, 380 are mounted in line with the first and second water tanks. A lower face of each auxiliary module matches the interface of the water tanks stations, whilst an upper face of the auxiliary modules is shaped to receive the first or second water tanks. Both the upper and lower faces of the auxiliary module are provided with suitable valve connectors for mating with the valve connectors of the water tank stations and water tanks. This arrangement is particularly suitable where the auxiliary module comprises a chilling unit or a pre-heating unit. A filtration unit may also be used in this configuration.

Figure 7:
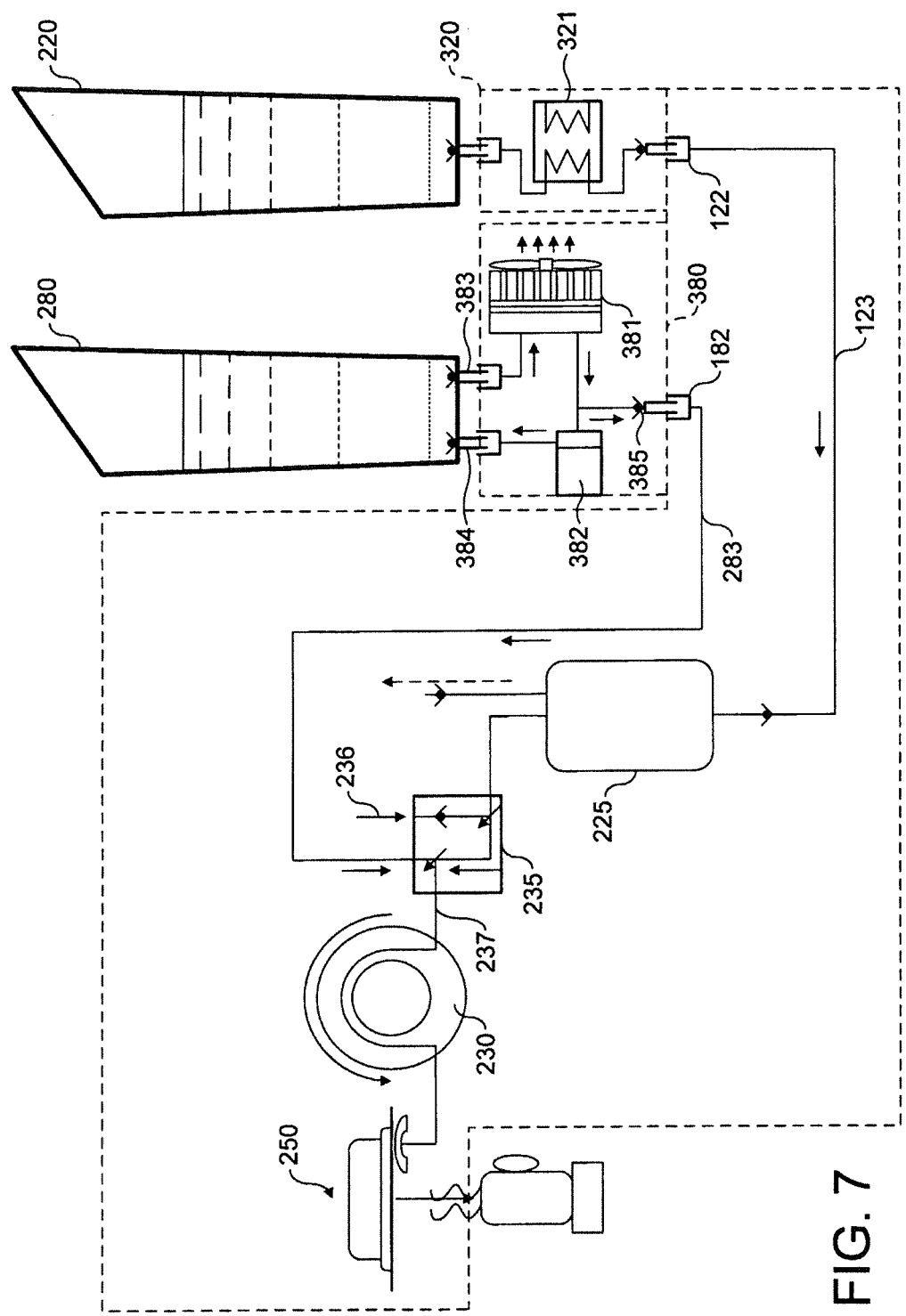
FIG. 7 is a schematic representation of the machine of FIG. 4.

FIG. 7 illustrates schematically the internal configuration of the second embodiment. The arrangement of the pump, water heater and dispensing valve are the same as in the first embodiment. As shown, the pre-heating module 320 comprises a heater 321. The chilling module 380 comprises a thermoelectric cooler (TEC) 381 which receives water from the second tank 280 via a tank outlet 383, cools the water and then re-circulates the water back to the second tank 280 via a tank inlet 384. Motive force for the re-circulation is provided by a dedicated pump 382 within the chilling module 380. When required water exits the chilling module 380 via valve 385. Other types of peltier heat pump or similar device may be used instead of the TEC 381.

In use, when a cold beverage is required, water is pumped from the second water tank 280 by the pump 230 to the cartridge head 250. Due to the presence of the chilling module 380 the water in the second tank 280 is maintained in a chilled state.

The chilling module 380 may be used to chill water in the second tank 280 that is initially at ambient or room temperature or may be used to maintain the temperature of water in the second tank 280 which has previously been chilled in a refrigerator.

The pre-heating module 320 may be used to heat water taken from the first tank 220 at ambient temperature by a set amount before passing the water to the main heater 225 in the machine housing.

As an alternative, the second tank may itself comprise a chilling mechanism, such as a TEC, as an integral part of the tank.

Figure 8:
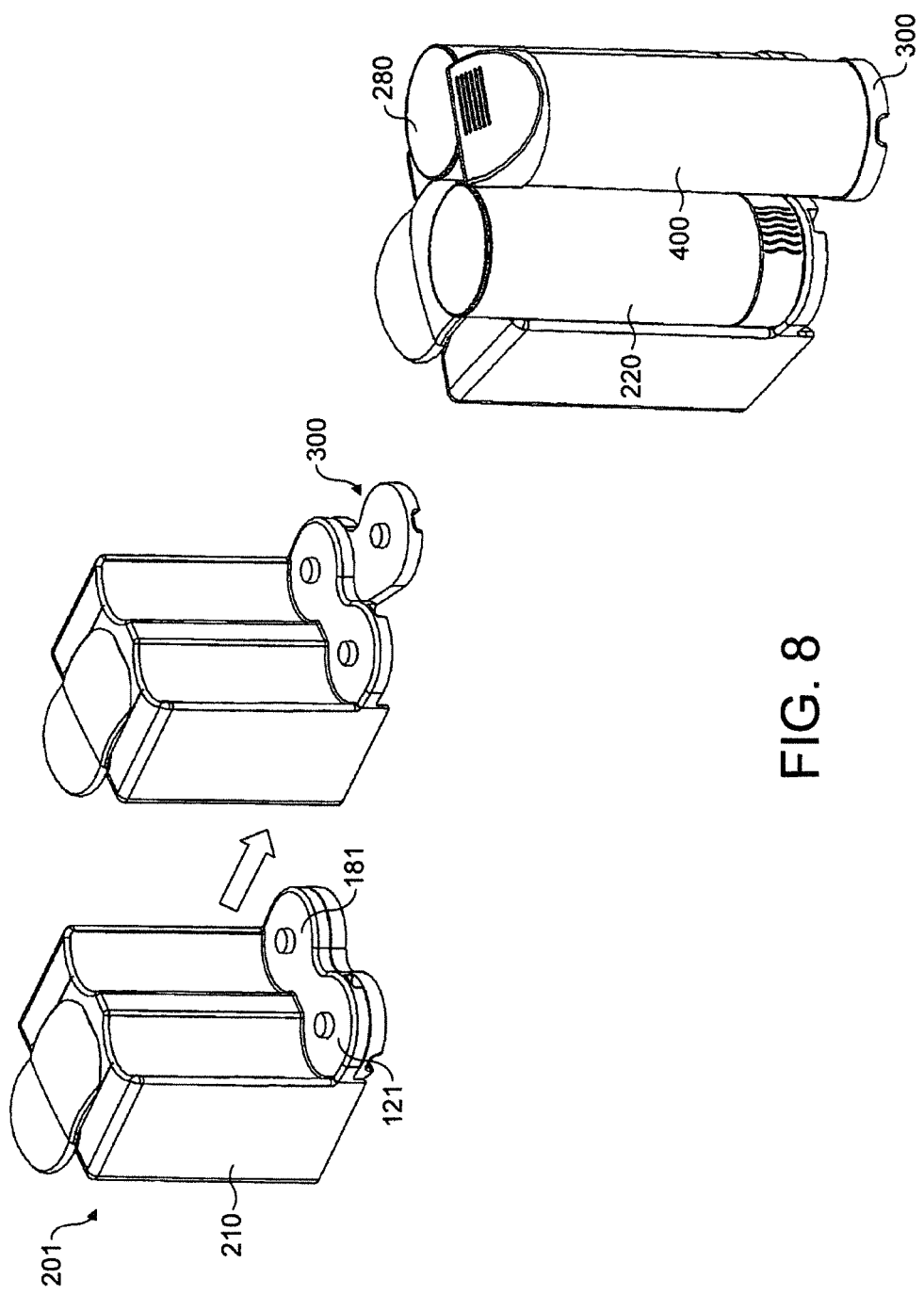
FIG. 8 shows a series of perspective views of a third embodiment of beverage preparation machine according to the present invention illustrating the fitting of two water tanks and an auxiliary module.

FIG. 8 shows a third embodiment of the present invention wherein the beverage preparation machine 201 is provided with an auxiliary module station 300 as well as the first and second water tank stations 120, 180. The auxiliary module station 300 is used to mount auxiliary modules in parallel to the first and second water tanks rather than in line with the tanks.

The auxiliary module station 300 comprises power and fluid connections. The auxiliary module station 300 may be rotated in between a storage position, in which the station is hidden from view below the first and second water tank stations, and an operating position as shown in FIG. 8 in which the station is accessible and is position rearward of the first and second tank stations. In alternative, non-illustrated versions, the auxiliary module station 300 may be moved between storage and operating positions by means of a translational movement, such as a sliding motion, or by being located on a flip-down panel which is lowered when the auxiliary module is to be used.

The auxiliary module 300 may be any of a chilling module, a pre-heating module, a water filtration unit, a disinfection module, a telemetry device or similar as described above.

Figure 9:
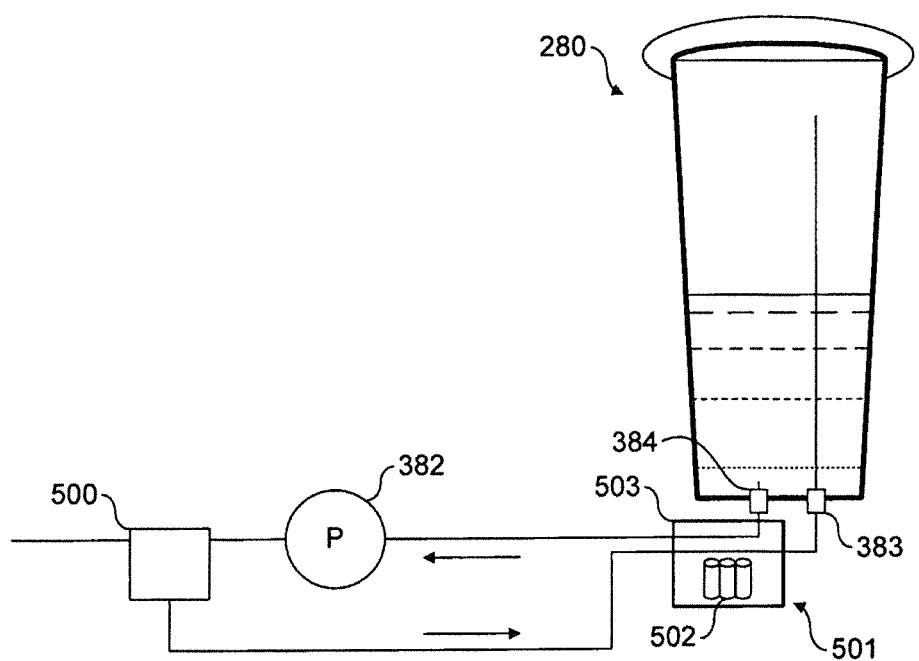
FIG. 9 is a schematic representation of a disinfection system for us with the prior embodiments.

FIG. 9 illustrates a modification to the system which can be utilised in any of the above embodiments. An ultra-violet (UV) chamber 501 is provided as part of a water re-circulation system. As shown water is recirculated from the second tank 280 by means of pump 382 and three-way valve 500 back to the second tank 280 via the UV chamber 501. This recirculation continues when water is not required to be transferred to the cartridge head 250. When water is required to dispense a beverage then this is diverted to the cartridge head 250 by use of the three-way valve 500.

The UV chamber 501 comprises a housing 503 and a plurality of UV emitting elements 502 which are focussed to illuminate the water passing through the chamber 501 with light in the UV range. Preferably, the piping used for conveying the water through the chamber 501 is formed from fluoroethylene polymer (FEP) to allow for good UV transmission across the piping. The UV emitting elements 502 comprises UV-emitting light emitting diodes (LEDs). The LEDs emit UV in a chosen wavelength between 250 and 320 nanometers (nm). The LEDs may have a relatively low power output compared with low-pressure mercury discharge UV lamps since the recirculation of the water through the chamber 501 many times increases the total UV exposure time of the water. In addition, the LEDs may be arranged to have a small focus area by the use of a suitable lens arrangement to enhance the disinfection effect. This allows less expensive and smaller UV LEDs to be utilised.

Preferably, the tank 280 or the water contained therein may be illuminated by a portion of the UV output of the LEDs which has been filtered. The tank 280 may be formed, or contain, a material which fluoresces when exposed to UV light.

The use of UV light to disinfect the water used in the system may be used for water recirculation in the first tank 220 and or the second water tank 280 irrespective of whether the water is also subject to chilling, heating or discharged at ambient temperature. The UV chamber 501 may be formed as part of the recirculation piping of a chilling module formed as part of the machine or as part of another auxiliary module connectable to one of the water or auxiliary module stations. Each reservoir station may be provided with an in-line UV chamber 501 if required.

The UV chamber 501 may be formed as part of the main housing of the machine or as part of a separate, connectable, auxiliary module. The UV chamber 501 and recirculation mechanism may be formed as part of a disinfection module per se or as part of a chilling module.

Figure 10:
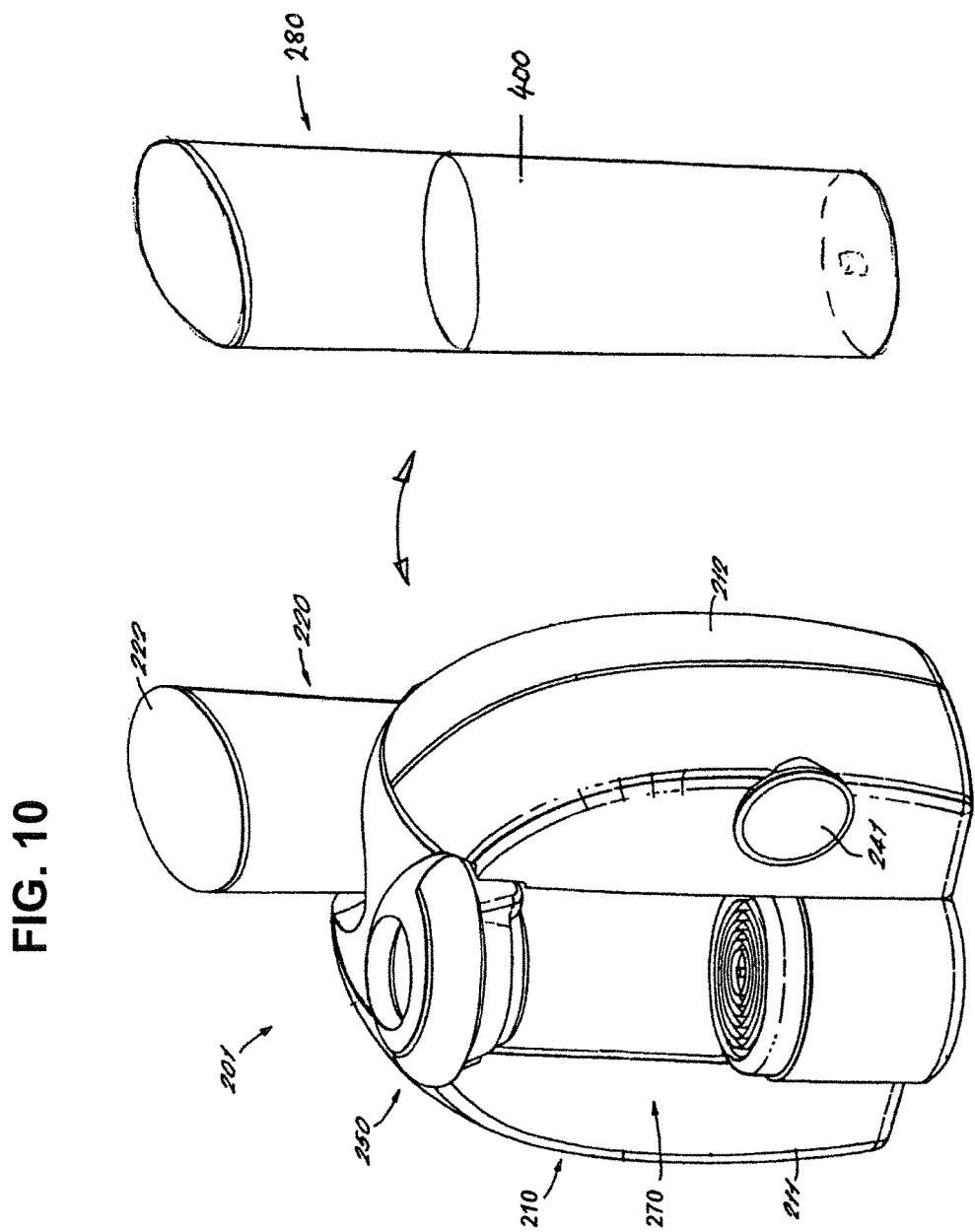
FIG. 10 is a schematic representation of a fourth embodiment of beverage preparation system according to the present invention.

FIG. 10 illustrates a fourth embodiment of system. In this system the beverage preparation machine 201 comprises a single reservoir station and two water tanks. The first water tank 220 contains water at ambient temperature and is to be used to prepare hot beverages. The second tank 280 contains water 400 at below ambient temperature and is used to prepare cold beverages. The tanks 220, 280 are interchangeable and swapped on and off the reservoir station as required. Advantageously, the second tank, when not mounted to the beverage preparation machine 201 is preferably stored in a refrigerator in order to create and maintain a chilled volume of water. In this way the system can quickly be used to make both hot and cold beverages without the necessity for chilling apparatus within the housing of the beverage preparation machine.

Preferably the second water tank 280 is thermally insulated and may be provided with a carrying handle. It may also be suitably shaped to fit within standard compartments of a refrigerator such as a door pocket.

In use of any of the first to third embodiments described above, an auxiliary module as required is mounted to the auxiliary module station or the first or second water tank station as appropriate. In addition, one or other or both of the first and second water tanks are positioned on the respective first and second water tank stations as appropriate.

The water for the beverage is sourced from the first or second water tank depending on the type of beverage to be dispensed. For example, where a chilled beverage is required the water is sourced from the second tank which may contain water pre-chilled in a refrigerator, or contain water chilled by a chilling module or integrated TEC. Where a hot beverage is required the water is sourced from the first tank and the water is passed to the heater 225, optionally via a pre-heating module.

The basic operational behaviour of the machine 201 thereafter for any of the embodiments set out above is described fully in WO2004/064585.

From the above it will be understood that in the present invention the auxiliary modules where present may be positioned in line or parallel to one or more tanks containing water for forming beverages. One, two or more auxiliary modules may be used in combination with one, two or more water tanks depending on the desired combination of functions. It will also be understood that the various types of auxiliary module described are given as examples only and may be used with one or more of the embodiments of beverage machine described above. The auxiliary modules and water tanks of the above embodiments may be used with beverage preparation machines having one, two or more reservoir stations.

The invention claimed is:

1. A beverage preparation machine for dispensing beverages comprising:
   a housing;
   a first reservoir station;
   a first reservoir for containing an aqueous medium, the first reservoir being connectable to said first reservoir station;
   an auxiliary module, wherein the auxiliary module comprises a first interface for connecting the auxiliary module to the first reservoir station and a second interface for connecting the first reservoir to the auxiliary module such that, on assembly, the auxiliary module is located in between the first reservoir and the first reservoir station;
   wherein the auxiliary module includes a beverage flow path for permitting flow of the aqueous medium from the first reservoir to the first reservoir station.

2. A beverage preparation machine as claimed in claim 1 further comprising a second reservoir station and a second reservoir for containing an aqueous medium, the second reservoir being connectable to said second reservoir station.

3. A beverage preparation machine as claimed in claim 2 wherein the auxiliary module may be connected in between the second reservoir and second reservoir station.

4. A beverage preparation machine as claimed in claim 2 further comprising a heater in fluid communication with at least one of the first reservoir station and the second reservoir station.

5. A beverage preparation machine as claimed in claim 1 wherein the first reservoir contains aqueous medium at ambient temperature.

6. A beverage preparation machine as claimed in claim 2 wherein the second reservoir contains aqueous medium at a temperature of between 5 and 30 degrees Celsius below ambient temperature.

7. A beverage preparation machine as claimed in claim 6 wherein the aqueous medium is at a temperature of between 5 and 15 degrees Celsius below ambient temperature.

8. A beverage preparation machine as claimed in claim 2 wherein the second reservoir contains aqueous medium at a temperature of between 4 and 15 degrees Celsius.

9. A beverage preparation machine as claimed in claim 2 wherein the second reservoir is thermally insulated.

10. A beverage preparation machine as claimed in claim 1 suitable for dispensing a range of hot and cold, extracted/infused or diluted beverages including, but not limited to, coffee, tea, cappuccino, hot chocolate, iced tea, fruit cordials, smoothies and frappes.

11. A beverage preparation machine as claimed in claim 1 wherein the auxiliary module is a chilling module.

12. A beverage preparation machine as claimed in claim 1 wherein the auxiliary module is a pre-heating module.

13. A beverage preparation machine as claimed in claim 1 wherein the auxiliary module is a telemetry module.

14. A beverage preparation machine as claimed in claim 1 wherein the auxiliary module is a disinfection module.

15. A beverage preparation machine as claimed in claim 1 further comprising a cartridge head in fluid communication with the first reservoir via the first reservoir station with the first reservoir and auxiliary module connected to the first reservoir station so that the auxiliary module is located between the first reservoir and the first reservoir station.

16. A beverage preparation machine for dispensing beverages comprising:
    a housing;
    a first reservoir station;
    a first reservoir for containing an aqueous medium, the first reservoir being connectable to said first reservoir station;
    an auxiliary module, wherein the auxiliary module comprises a first interface for connecting the auxiliary module to the first reservoir station and a second interface for connecting the first reservoir to the auxiliary module such that, on assembly, the auxiliary module is located in between the first reservoir and the first reservoir station;
    wherein the auxiliary module includes a pump.

17. A beverage preparation machine for dispensing beverages comprising:
    a housing;
    a first reservoir station;
    a first reservoir for containing an aqueous medium, the first reservoir being connectable to said first reservoir station;
    an auxiliary module, wherein the auxiliary module comprises a first interface for connecting the auxiliary module to the first reservoir station and a second interface for connecting the first reservoir to the auxiliary module such that, on assembly, the auxiliary module is located in between the first reservoir and the first reservoir station;
    wherein the auxiliary module is a chilling module; and
    wherein the chilling module comprises a recirculation mechanism for diverting aqueous medium cooled by the chilling module back to the reservoir.

18. A beverage preparation machine for dispensing beverages comprising:
    a housing;
    a first reservoir station;
    a first reservoir for containing an aqueous medium, the first reservoir being connectable to said first reservoir station;
    an auxiliary module, wherein the auxiliary module comprises a first interface for connecting the auxiliary module to the first reservoir station and a second interface for connecting the first reservoir to the auxiliary module such that, on assembly, the auxiliary module is located in between the first reservoir and the first reservoir station; and
    wherein the auxiliary module includes an aqueous medium filtration unit.

* * * * *